(12) United States Patent
Bakker et al.

(10) Patent No.: US 6,527,991 B1
(45) Date of Patent: Mar. 4, 2003

(54) METHOD FOR EMBOSSING A FOAM ARTICLE

(75) Inventors: Lynn A. Bakker, Hardy, VA (US); David W. Cox, Catawba, NC (US); Erle J. Medford, Burlington, NC (US); James D. Symes, Hickory, NC (US)

(73) Assignee: RBX Industries, Inc., Roanoke, VA (US)

( * ) Notice: Subject to any disclaimer, the term of this patent is extended or adjusted under 35 U.S.C. 154(b) by 0 days.

(21) Appl. No.: 09/829,942

(22) Filed: Apr. 11, 2001

(51) Int. Cl.[7] ............................................. B29C 44/20
(52) U.S. Cl. .................... 264/45.9; 264/46.1; 264/46.3; 264/54; 264/150; 264/293; 264/320
(58) Field of Search .................... 264/54, 293, 150, 264/320, 14.6, 45.9, 46.1, 46.2, 46.3; 156/79

(56) References Cited

U.S. PATENT DOCUMENTS

| | | | |
|---|---|---|---|
| 2,943,949 A | | 7/1960 | Petry |
| 3,655,312 A | | 4/1972 | Erb et al. |
| 3,723,582 A | | 3/1973 | Winstead |
| 3,932,245 A | | 1/1976 | Erb et al. |
| 4,022,643 A | | 5/1977 | Clark |
| 4,076,867 A | | 2/1978 | Lewick, Jr. et al. |
| 4,187,131 A | * | 2/1980 | Shortway et al. .............. 156/79 |
| 4,193,927 A | | 3/1980 | Kauffmann et al. |
| 4,213,925 A | | 7/1980 | Kiyono et al. |
| 4,241,125 A | * | 12/1980 | Canning et al. ............... 156/79 |
| 4,401,611 A | * | 8/1983 | Mansolillo et al. ......... 264/46.4 |
| 4,423,110 A | | 12/1983 | Sato |
| 4,588,545 A | | 5/1986 | Kauffman et al. |
| 4,665,680 A | * | 5/1987 | Prader ......................... 53/411 |
| 5,350,544 A | | 9/1994 | Bambara et al. |
| 5,376,203 A | | 12/1994 | Syme |
| 5,662,977 A | | 9/1997 | Spain et al. |
| 5,681,652 A | | 10/1997 | Cope |
| 5,928,741 A | | 7/1999 | Anderson et al. |
| 5,972,257 A | * | 10/1999 | Liu ............................... 264/54 |
| 6,114,008 A | * | 9/2000 | Eby et al. .................... 428/151 |
| 6,238,602 B1 | * | 5/2001 | Liu ............................ 264/46.4 |

* cited by examiner

*Primary Examiner*—Allan R. Kuhns
(74) *Attorney, Agent, or Firm*—Reed Smith LLP

(57) ABSTRACT

A method of manufacturing a foamed article includes embossing or otherwise impressing a three dimensional pattern into a surface of an article formed from a polymer composition with a blowing agent. The three dimensional pattern is formed prior to activation of the blowing agent and curing of the article. The article is then heated to activate the blowing agent and cure the material. The final article retains the three dimensional pattern in its expanded form.

21 Claims, 2 Drawing Sheets

METHOD FOR EMBOSSING A FOAM ARTICLE

BACKGROUND OF THE INVENTION

The present invention relates broadly to the manufacture of foamed elastomeric products and more particularly to a foamed elastomeric sheet product having a multi-dimensional pattern formed on one or both surfaces thereof.

Foamed sheet materials have a wide variety of applications in which it is desirable or necessary for the sheet to have a three-dimensional pattern formed on at least one surface of the sheet. Several methods have been used to incorporate the formation of such patterns into existing sheet manufacturing processes. These methods, however, generally require cutting or reforming of a cured foam article and therefore tend to have a detrimental impact on the surface texture or the internal structure of the product. Other methods involve molding processes that add costly steps to the overall manufacturing process or require a discontinuous process.

SUMMARY OF THE INVENTION

There is accordingly a need for a method of embossing a foamed sheet that does not degrade the surface texture or structure of the sheet and that can be implemented as or incorporated into a continuous manufacturing process.

It is therefore an objective of the present invention to provide a method of producing in a continuous manner a foamed article having a surface with a three dimensional pattern formed therein.

It is another objective of the present invention to provide such a method wherein the three dimensional pattern is formed in such a way that the foamed article retains a substantially uniform density through the article.

It is yet another objective of the present invention to provide such a method wherein the surface texture within and around the three dimensional pattern is substantially similar to the surface texture of areas with no three dimensional pattern.

To these ends, a method of manufacturing a foamed polymeric article according to the present invention comprises forming an uncured article from a polymer composition having a chemical blowing agent included therein. The method further comprises impressing a three dimensional pattern in at least one surface of the uncured article and activating the chemical blowing agent, thereby causing the uncured article to expand while retaining the three dimensional pattern. The article is then cured to form a cured foamed polymeric article with the three dimensional pattern retained in the at least one surface.

The step of forming the uncured article in a method of manufacturing a foamed polymeric article according to the present invention preferably includes extruding the polymer composition.

The uncured article formed in the method according to the present invention may be formed as a continuous sheet. To produce the continuous sheet, the step of forming the article may include extruding the polymeric composition to form a continuous sleeve having inner and outer cylindrical surfaces defining a sleeve wall. The step of forming the article would also include cutting the sleeve wall and flattening the sleeve wall to form the continuous sheet.

The step of impressing a three dimensional pattern according to a method of manufacturing a foamed polymeric article according to the present invention may include embossing the three dimensional pattern into the at least one surface by engaging the at least one surface with an engraved roller.

The polymer composition used to form a foamed polymeric article in a method according to the present invention preferably comprises a base polymer selected from the group consisting of neoprene, nitrile, styrene butadiene rubber (SBR), chlorosulfonated polyethylene (Hypalon®) and ethylene propylene diene monomer (EPDM). The polymer composition may further comprise a modifier selected from the group consisting of polyvinyl chloride (PVC) resin, high styrene resin, and PVC copolymers.

The chemical blowing agent used to form a foamed polymeric article in a method according to the present invention may be an azocarbonamide.

An illustrative embodiment of a method of manufacturing a foamed polymeric sheet according to the present invention comprises the steps of providing a polymer composition having a chemical blowing agent included therein. The polymer composition may be extruded to form a continuous polymeric sheet, which may be passed through a pair of rollers. At least one of the rollers is engraved so as to emboss a three-dimensional pattern into a surface of the continuous polymeric sheet. Subsequently the chemical blowing agent is activated to cause the continuous polymeric sheet to expand to form a continuous foamed sheet and curing the continuous polymeric sheet with the three dimensional pattern retained in the at least one surface.

The chemical blowing agent of the polymer composition in a method according to the present invention is preferably heat-activated and has a predetermined activation temperature. The step of extruding the polymer composition is preferably carried out at a temperature below the activation temperature of the chemical blowing agent. The step of activating the chemical blowing agent may include passing the continuous polymeric sheet through an oven, thereby heating the polymer composition above the activation temperature of the chemical blowing agent.

Another illustrative method of manufacturing a foamed polymeric sheet according to the present invention comprises providing a polymer composition having a chemical blowing agent included therein and extruding the polymeric composition to form a continuous sleeve. The continuous sleeve has inner and outer cylindrical surfaces defining a sleeve wall. The sleeve wall is cut and flattened to form a continuous polymeric sheet. The continuous polymeric sheet may be passed through a pair of rollers, at least one of the rollers being engraved so as to emboss a three-dimensional pattern into a surface of the continuous polymeric sheet. Subsequently, the chemical blowing agent is activated to cause the continuous polymeric sheet to expand to form a continuous foamed sheet, and curing the continuous polymeric sheet with the three dimensional pattern retained in the at least one surface.

DESCRIPTION OF THE PREFERRED EMBODIMENTS

The present invention involves the formation of a foamed polymer article with at least one surface having a three dimensional pattern formed therein. The three dimensional pattern is produced by impressing or embossing the pattern into the uncured polymer material prior to the activation of a blowing agent mixed with the polymer.

Figure 1:
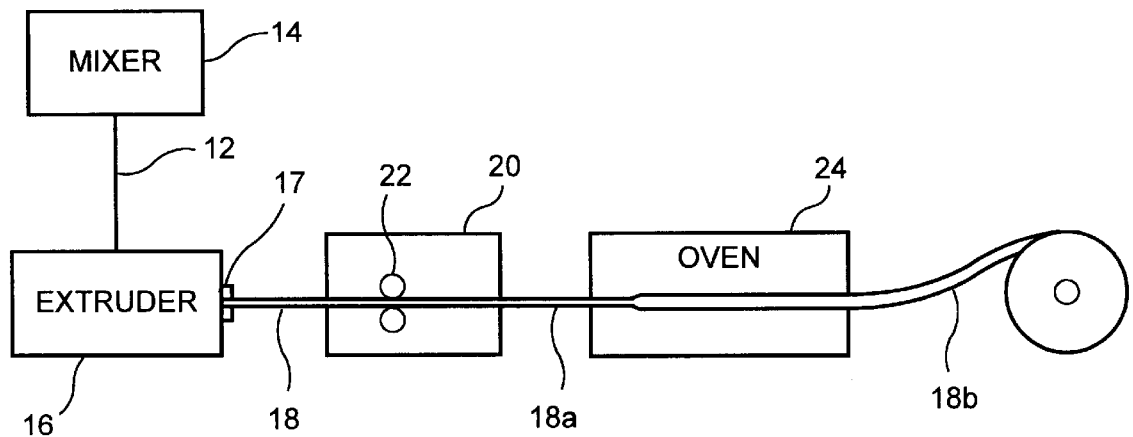
FIG. 1 is a schematic illustration of a method of manufacturing an embossed foamed article according to the present invention.

A method according to the present invention is illustrated generally in FIG. 1. In this method, a polymeric material 12 including a polymer composition and a chemical blowing agent is mixed in a mixer 14. The polymer composition may comprise 1–99% by weight of the polymeric material, and the chemical blowing agent may comprise 99–1% by weight of the polymeric material 12. Preferably, the polymer composition comprises about 80% to about 90% by weight and the blowing agent comprises the remainder, however, fillers and other material may also be included in the polymeric material 12.

The mixer 14 may be any conventional mechanical shear mixer such as a Banbury mixer. The polymeric material 12 is then passed to an extruder 16 that forms a continuous extrudate 18 from the polymeric material 12. It will be understood that while other extruded shapes may be formed using the method of the present invention, the following description is primarily directed to an extrudate 18 that is a generally planar, continuous sheet. The continuous sheet will typically have an uncured, unfoamed thickness that may range from about 0.2 inches to about 0.75 inches. The extruder 16 may include a sheet die 17 for directly extruding the continuous sheet or may alternatively include a die (not shown) for extruding a continuous sleeve having a uniform annular wall thickness. If the sleeve die is used, the continuous sheet may be formed by cutting through the sleeve wall immediately following the extrusion of the sleeve. The extrudate 18 is then flattened to form a continuous sheet.

The polymeric composition preferably includes a base polymer including but not limited to neoprene, nitrile, SBR, Hypalon®, EPDM and others similar polymers. The composition may also have a physical modifier such as a PVC resin, high styrene resin, or PVC copolymer. The composition may further include fillers, plasticizers, stabilizers, accelerators and cross-linking agents known to those skilled in the art. The polymeric material will also include a chemical blowing agent that has a predetermined activation temperature. The chemical blowing agents may include, but are not limited to, azodicarbonamide, dinitrosopentamethylenetetramine (DPT), p,p-oxybis benzene sulfonyl hydrazide (OBSH), p-toluenesulfonylhydrazide (TSH), diphenylsulfon-3,3'-disulfonyl hydrazide, and p-toluene sulfonyl semicarbazide (PTSS).

The extrudate 18 is passed to an embossing station 20 where one or more embossing rollers 22 are used to impress a three dimensional pattern into a surface of the extrudate 18. At least one of the rollers is an engraving roller that carries a raised pattern around its circumference. The engraving roller is held in engagement with a surface of the extrudate with sufficient pressure that the raised pattern on the engraving roller causes a corresponding impression pattern in the surface of the uncured extrudate. This pattern is repeated for each revolution of the roller. If the pattern is to be applied to only a single surface of a sheet-like extrudate, one roller will be an engraving roller and the other will typically be a flat back-up roller. Alternatively, the extrudate may be passed over a flat, low friction surface to provide a base and a single roller used to impress the pattern into the opposite surface of the sheet.

The embossing station 20 may include sequentially staged roller pairs or a plurality of single rollers for impressing patterns on multiple surfaces or for impressing multiple patterns on a single surface.

The impressed three dimensional pattern may be a random pattern of impressions that may or may not be interconnected. The pattern may also be a regular pattern of continuous grooves that form a gridwork of regular geometric shapes. One particularly useful type of pattern is the periodic impression of text for use in spelling out the trade name of a product or manufacturer. The impressions made by the engraving roller may have straight or curved walls and may also be tapered.

It will be understood by those having ordinary skill in the art that other methods of impressing the three dimensional pattern into a surface of the article may be used. Other methods include, but are not limited to, molding or stamping. Any method that provides a well-defined impression with a depth of at least about 0.1 inches may be used without departing from the scope of the present invention.

After exiting the engraving station, the embossed extrudate 18a is passed through an oven 24 or other device suitable for activating the blowing agent. In the preferred embodiment, the oven 24 heats the uncured extrudate 18a to a temperature higher than the activation temperature of the chemical blowing agent. Typical temperatures range from about 250° F. to about 390° F. This activates the blowing agent, which forms cells of gas 40 that are substantially uniformly distributed throughout the uncured extrudate 18a. As the gas expands, the dimensions of the extrudate are expanded proportionally. Importantly, the three dimensional impression in the extrudate is retained in the surface of the extrudate and is also expanded proportionally.

The amount of expansion is determined by the polymeric material's foam expansion factor, which is a function of the material constituents and, in particular, the amount and type of blowing agent used. It will be readily understood by one skilled in the art that different chemical blowing agents will have different activation temperatures and provide different expansion properties. The amount of the chemical blowing agent will vary depending on the type of chemical blowing agents but the amount should be sufficient to form cells of gas that are substantially uniformly distributed throughout the uncured material and expand the uncured material proportionally to maintain the three-dimensional impression.

In addition to activating the blowing agent, the heat from the oven 24 accelerates the cure of the polymeric material in the extrudate. It will be understood by those having ordinary skill in the art that, given enough time, the polymeric material will reach cure at room temperature. In the short term, however, the material will remain substantially uncured until a vulcanizing process is initiated by passing the material through an oven. By passing the extrudate 18a into an oven 24 at a temperature above the activation temperature of the blowing agent, the cure rate of the polymeric material is increased substantially simultaneously with the activation of the blowing agent and consequent expansion of the extrudate 18a. The temperature in the oven 24 and the residence time of the extrudate 18a in the oven 24 may be varied depending on the formulation of the polymer composition and the thickness of the article. Residence time is a function of the length of the oven 24 and the speed at which the extrudate 18a is moved therethrough.

Figure 2:
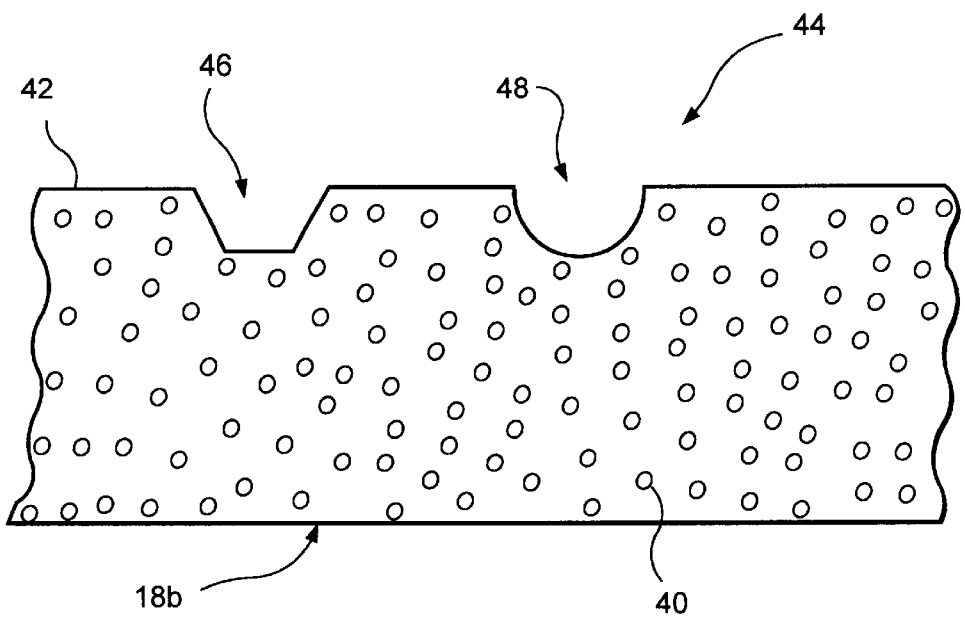
FIG. 2 is a sectional view of an embossed foamed polymeric article formed using a method according to the present invention.
Figure 3:
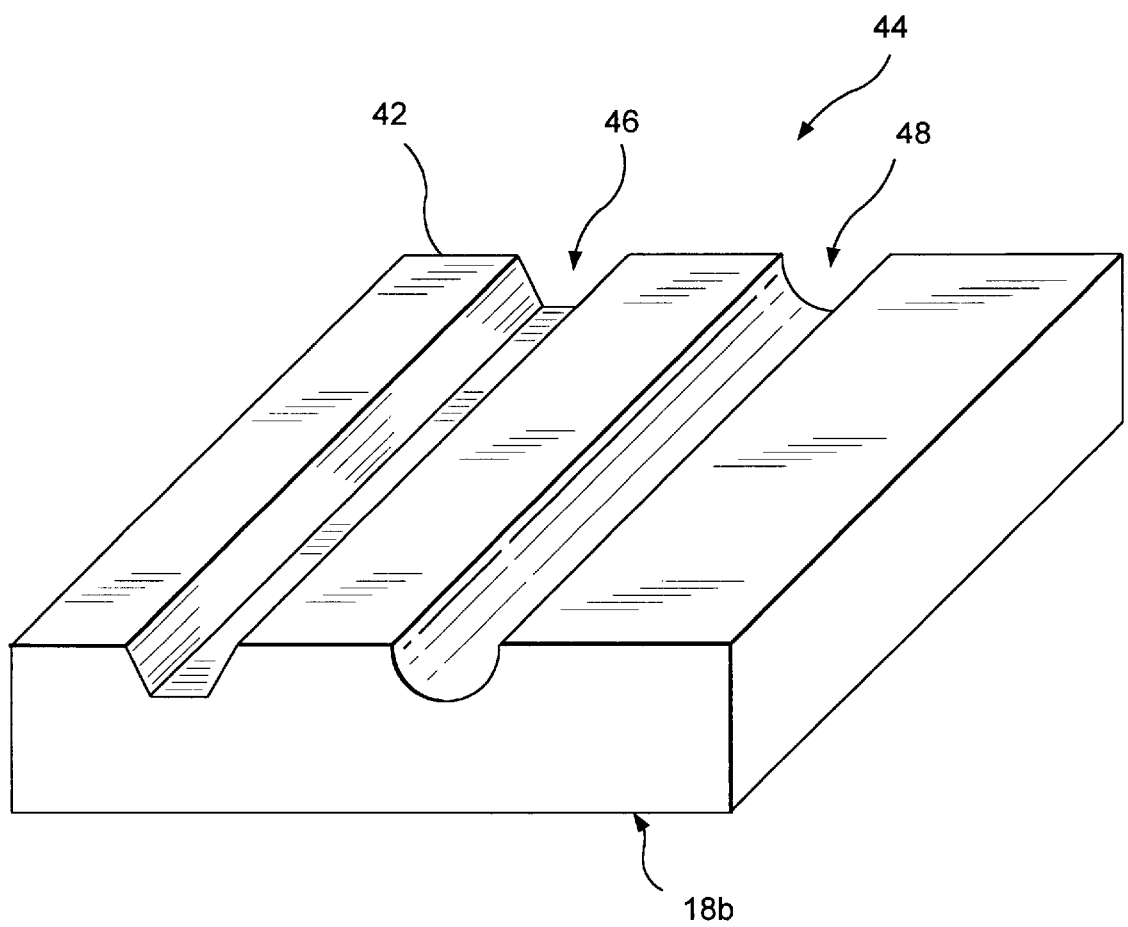
FIG. 3 is an isometric view of the sheet in FIG. 2.

The final cured foam article 186 includes a permanently set three dimensional pattern corresponding to the pattern impressed into the surface of the uncured extrudate. A cross-section of a portion of an exemplary article 186 is shown in FIGS. 2 and 3. This exemplary article 186 has a pattern 44 formed in its upper surface 42 that includes a tapered, straight-walled depression 46 and a curve-walled depression 48.

The final foamed article 186 is taken up into a roll 30 as shown in FIG. 1. Alternatively, the article may be cut into individual sheets or smaller articles as desired. The polymeric composition and blowing agent used to form the extrudate are preferably selected so as to result in a closed-cell foamed article 186. This results in a relatively smooth textured surface throughout the article, including in the areas in and around the three dimensional impressions. It also provides an article having a substantially uniform density throughout.

The method of the present invention thus provides a significant improvement over previous methods of forming a pattern in a foamed article. Specifically, it provides a foamed article without the rough appearance resulting from cutting a pattern into the cured foam. It also avoids the non-uniform structure obtained when a pattern is melted, burned or pressed into a surface of cured foam.

In addition to the advantages obtained in the appearance and form of the resulting article, the present method provides significant advantages with regard to production efficiency. The method may be easily incorporated into existing continuous production lines and eliminates the need for post-processing of the cured foamed article to form the desired pattern.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of manufacturing a foamed polymeric article comprising the steps of:

forming an uncured article in the form of a continuous sheet from a polymer composition having a chemical blowing agent included therein;

impressing a three dimensional pattern in at least one surface of the uncured article;

activating the chemical blowing agent after the step of impressing a three dimensional pattern, thereby causing the uncured article to expand while retaining the three, dimensional pattern; and curing the uncured article to form a cured foamed polymeric article with the three dimensional pattern retained in the at least one surface.

2. A method of manufacturing a foamed polymeric article according to claim 1 wherein the step of forming the uncured article includes extruding the polymer composition.

3. A method of manufacturing a foamed polymeric article according to claim 1 wherein the uncured article is formed as a continuous sheet.

4. A method of manufacturing a foamed polymeric article according to claim 1 wherein the step of forming the article includes extruding the polymeric composition to form a continuous sleeve having inner and outer cylindrical surfaces defining a sleeve wall;

cutting the sleeve wall; and flattening the sleeve wall to form the continuous sheet.

5. A method of manufacturing a foamed polymeric article according to claim 1 wherein the step of impressing a three dimensional pattern includes embossing the three dimensional pattern into the at least one surface by engaging the at least one surface with an engraved roller.

6. A method of manufacturing a foamed polymeric article according to claim 1 wherein the polymer composition comprises a base polymer selected from the group consisting of neoprene, nitrile, styrene butadiene rubber (SBR), chlorosulfonated polyethylene (Hypalon®), and ethylene propylene diene monomer (EPDM).

7. A method of manufacturing a foamed polymeric article according to claim 6 wherein the polymer composition further comprises a modifier selected from the group consisting of PVC resin, high styrene resin, and PVC copolymers.

8. A method or manufacturing a roamed polymeric article according to claim 1 wherein the chemical blowing agent is selected from the group consisting of azodicarbonamide, dinitrosopentamethylenetetramine (DPT), p,p-oxybis benzene sulfonyl hydrazide (OBSH), p-toluenesulfonylhydrazide (TSH), diphenylsulfon-3,3'-disulfonyl hydrazide, p-toluene sulfonyl semicarbazide (PTSS), and combinations thereof.

9. A method of manufacturing a foamed polymeric sheet comprising the steps of:

providing a polymer composition having a chemical blowing agent included therein;

extruding the polymer composition to form a continuous polymeric sheet;

passing the continuous polymeric sheet through a pair of rollers, at least one of the rollers being engraved so as to emboss a three-dimensional pattern into a surface of the continuous polymeric sheet;

activating the chemical blowing agent after the three-dimensional pattern is embossed into the surface of the continuous polymeric sheet, thereby causing the continuous polymeric sheet to expand to form a continuous foamed sheet; and curing the continuous polymeric sheet with the three dimensional pattern retained in the at least one surface.

10. A method of manufacturing a foamed polymeric sheet according to claim 9 wherein the chemical blowing agent is heat-activated and has a predetermined activation temperature, the step of extruding the polymer composition is carried out at a temperature below the activation temperature of the chemical blowing agent, and the step of activating the chemical blowing agent includes passing the continuous polymeric sheet through an oven, thereby heating the polymer composition above the activation temperature of the chemical blowing agent.

11. A method of manufacturing a foamed polymeric article according to claim 9 wherein the polymer composition comprises a base polymer selected from the group consisting of neoprene, nitrile, styrene butadiene rubber (SBR), chlorosulfonated polyethylene (Hypalon®), and ethylene propylene diene monomer (EPDM).

12. A method of manufacturing a foamed polymeric article according to claim 11 wherein the polymer composition further comprises a modifier selected from the group consisting of PVC resin, high styrene resin, and PVC copolymers.

13. A method of manufacturing a roamed polymeric article according to claim 9 wherein the chemical blowing agent is selected from the group consisting of azodicarbonamide, dinitrosopentamethylenetetramine DPT), p,p-oxybis benzene sulfonyl hydrazide (OBSH), p-toluenesulfonylhydrazide (TSH), diphenylsulfon-3,3'-disulfonyl hydrazide, p-toluene sulfonyl semicarbazide (PTSS), and combinations thereof.

14. A method of manufacturing a foamed polymeric sheet comprising the steps of:

providing a polymer composition having a chemical blowing agent included therein;

extruding the polymer composition to form a continuous sleeve having inner and outer cylindrical surfaces defining a sleeve wall;

passing the continuous polymeric sheet through a pair of rollers, at least one of the rollers being engraved so as to emboss a three-dimensional pattern into a surface of the continuous polymeric sheet;

activating the chemical blowing agent after the three-dimensional pattern is embossed into the surface of the continuous polymeric sheet, thereby causing the continuous polymeric sheet to expand to form a continuous foamed sheet; and curing the continuous polymeric sheet with the three dimensional pattern retained in the at least one surface.

15. A method of manufacturing a foamed polymeric sheet according to claim 14 wherein the chemical blowing agent is heat-activated and has a predetermined activation temperature, the step of extruding the polymer composition is carried out at a temperature below the activation temperature of the chemical blowing agent, and the step of activating the chemical blowing agent includes passing the continuous polymeric sheet through an oven, thereby heating polymer composition above the activation temperature of the chemical blowing agent.

16. A method of manufacturing a foamed polymeric article according to claim 14 wherein the polymer composition comprises a base polymer selected from the group consisting of neoprene, nitrile, styrene butadiene rubber (SBR), chlorosulfonated polyethylene (Hypalon®), and ethylene propylene diene monomer (EPDM).

17. A method of manufacturing a foamed article according to claim 16 wherein the polymer composition further comprises a modifier selected from the group consisting of PVC resin, high styrene resin, and PVC copolymers.

18. A method of manufacturing a foamed polymeric article according to claim 14 wherein the chemical blowing agent is selected from the group consisting of azodicarbonamide, dinitrosopentamethylenetetramine (DPT), p,p-oxybis benzene sulfonyl hydrazide (OBSH), p-toluenesulfonylhydrazide (TSH), diphenylsulfon-3,3'-disulfonyl hydrazide, p-toluene sulfonyl semicarbazide (PTSS), and combinations thereof.

19. A method of manufacturing a foamed polymeric sheet comprising the steps of:

providing a polymer composition having a chemical blowing agent included therein;

extruding the polymer composition to form a continuous polymeric sheet;

passing the continuous polymeric sheet through a pair of rollers, at least one of the rollers being engraved so as to emboss a three-dimensional pattern into a surface of the continuous polymeric sheet;

activating the chemical blowing agent after the three-dimensional pattern is embossed into the surface of the continuous polymeric sheet, thereby causing the continuous polymeric sheet to expand to form a continuous foamed sheet; and curing the continuous polymeric sheet with the three dimensional pattern retained in the at least one surface;

wherein the chemical blowing agent is heat-activated and has a predetermined activation temperature, the step of extruding the polymer composition is carried out at a temperature below the activation temperature of the chemical blowing agent, and the step of activating the chemical blowing agent includes passing the continuous polymeric sheet through an oven, thereby heating the polymer composition above the activation temperature of the chemical blowing agent.

20. A method of manufacturing a foamed polymeric sheet comprising the steps of:

providing a polymer composition having a chemical blowing agent included therein;

extruding the polymer composition to form a continuous polymeric sheet;

passing the continuous polymeric sheet through a pair of rollers, at least one of the rollers being engraved so as to emboss a three-dimensional pattern into a surface of the continuous polymeric sheet;

activating the chemical blowing agent after the three-dimensional pattern is embossed into the surface of the continuous polymeric sheet, thereby causing the continuous polymeric sheet to expand to form a continuous foamed sheet; and curing the continuous polymeric sheet with the three dimensional pattern retained in the at least one surface;

wherein the polymer composition comprises a base polymer selected from the group consisting of neoprene, nitrile, styrene butadiene rubber (SBR), chlorosulfonated polyethylene (Hypalon®), and ethylene propylene diene monomer (FPDM).

21. A method of manufacturing a foamed polymeric sheet comprising the steps of:

providing a polymer composition having a chemical blowing agent included therein;

extruding the polymer composition to form a continuous polymeric sheet;

passing the continuous polymeric sheet through a pair of rollers, at least one of the rollers being engraved so as to emboss a three-dimensional pattern into a surface of the continuous polymeric sheet;

activating the chemical blowing agent after the three-dimensional pattern is embossed into the surface of the continuous polymeric sheet, thereby causing the continuous polymeric sheet to expand to from a continuous foamed sheet; and curing the continuous polymeric sheet with the three dimensional pattern retained in the at least one surface;

wherein the chemical blowing agent is selected from the group consisting of azodicarbonamide, dinitrosopentamethylenetetramine (DPT), p,p-oxybis benzene sulfonyl hydrazide (OBSH), p-toluenesulfonylhydrazide (TSH), diphenylsulfon-3,3'-disulfonyl hydrazide, p-toluene sulfonyl semicarbazide (PTSS), and combinations thereof.

* * * * *